United States Patent Office 2,742,142
Patented Apr. 17, 1956

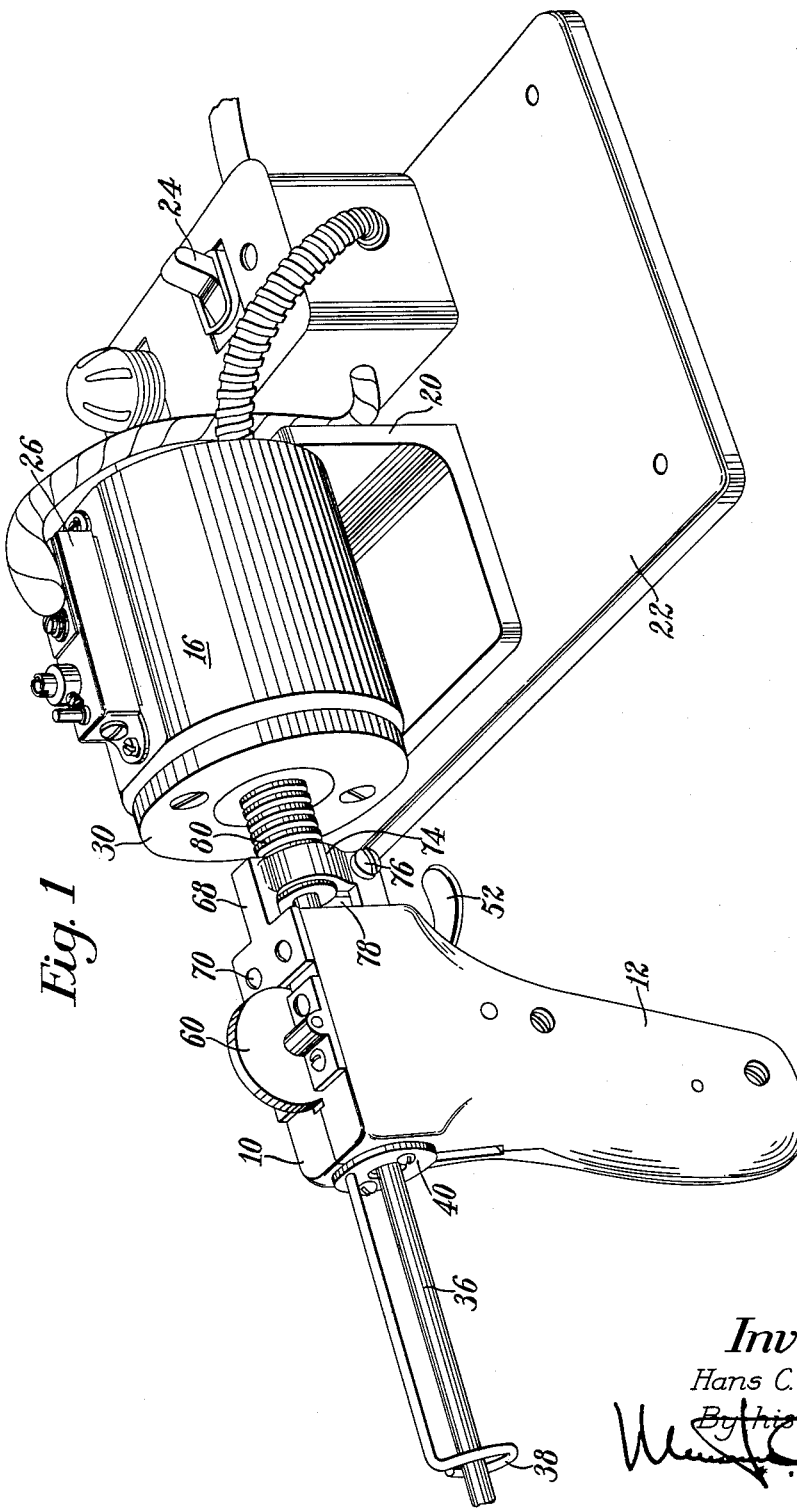

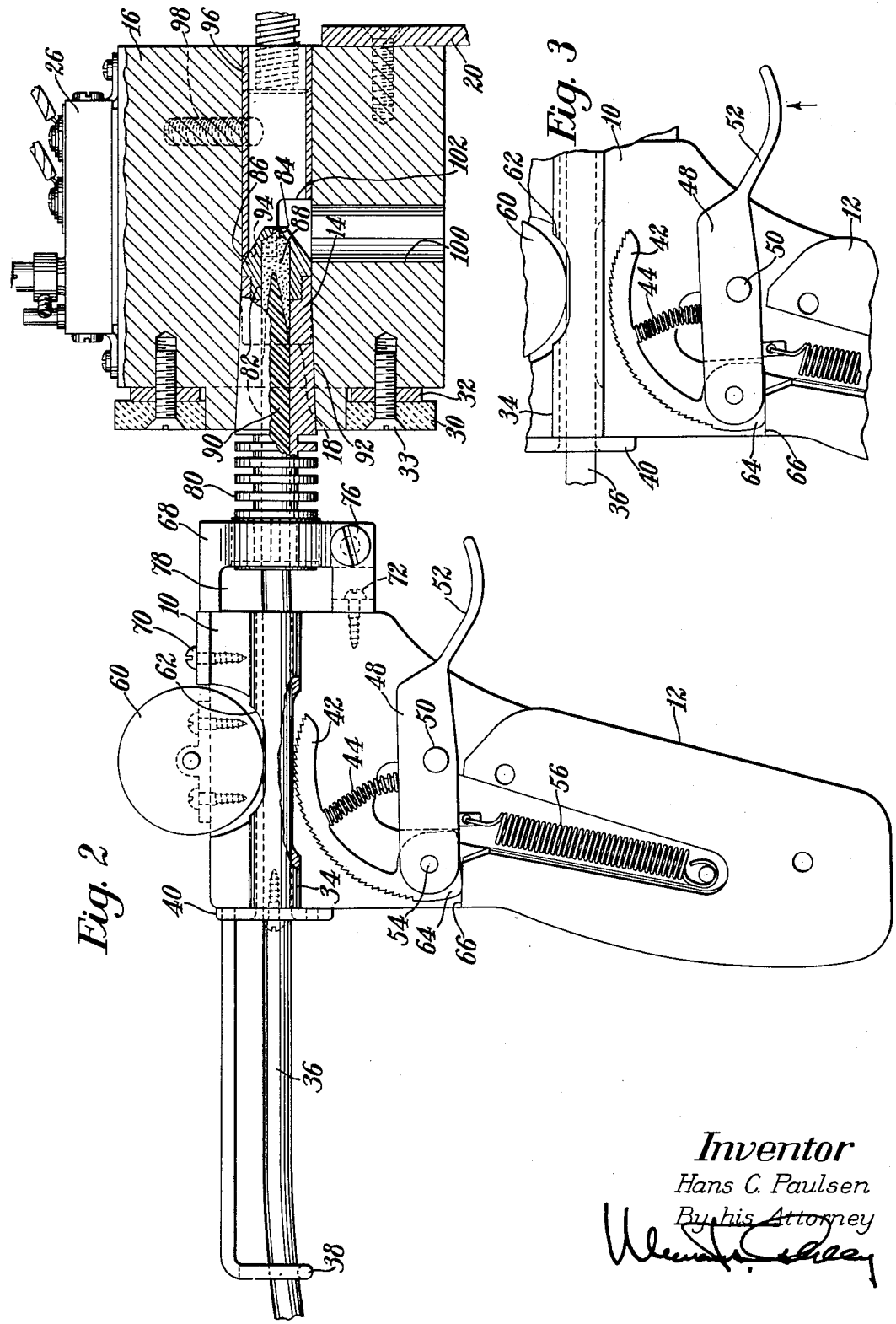

2,742,142

PORTABLE CEMENT EXTRUDERS

Hans C. Paulsen, Medford, Mass., assignor to United Shoe Machinery Corporation, Flemington, N. J., a corporation of New Jersey Application December 8, 1951, Serial No. 260,689

2 Claims. (Cl. 203—110)

This invention relates to portable cement extruders and is herein illustrated as embodied in a device for handling thermoplastic cements in rod form.

There are many instances in which it is desirable to apply only a small quantity of quick setting adhesive or cement to a single piece of work, for example, in closing a carton, in lasting a shoe or in repairing a piece of furniture, and thermoplastic cements are very satisfactory for such work because of their quick setting properties and the strong bond which can be obtained with them.

Accordingly, an object of the invention is to provide a novel portable cement-applying tool in which thermoplastic cement in convenient rod form can be easily and effectively used.

Such tools often have a heatable nozzle in which there is a passage alined with a passage in the body of the tool. Usually they are so arranged that the temperature of the portion of a rod back of the nozzle will be maintained below the melting point of the cement while the outlet end of the nozzle is raised to a temperature high enough to insure the melting of the end portion of the cement rod at a speed consistent with the probable utilization of the adhesive material.

A feature of the invention resides in an improved rod-feeding mechanism adapted to be manually operated as the need for more cement arises. As illustrated, this mechanism is so arranged that a reverse movement of the finger-engaging portion of the mechanism is effective to disengage the mechanism from the rod so that the rod may be withdrawn, as for the substitution of a different kind of material.

These and other features of the invention will best be understood from a consideration of the following specification taken in connection with the accompanying drawings in which Fig. 1 is an angular view of my portable extruding tool with its nozzle positioned in a heating stand;

Fig. 2 is a vertical section through the stand and part of the nozzle while the tool has half of the handle removed to expose the rod-feeding mechanism; and Fig. 3 is a fragmentary view showing the rod-feeding mechanism in disengaged position.

My novel portable extruding tool comprises a body portion 10 having a pistol type handle 12 and an applying head or nozzle 14 supported on the body portion and adapted to be inserted in the socket of a heater 16 during intervals of nonuse. This heater 16 is provided with one or more electric heating units 18 (Fig. 2) and the heater block itself is mounted upon an upright member 20 attached to a stand 22. An electric supply for the heater units includes a switch 24 and a thermostat 26 adjusted to maintain the temperature near the nozzle outlet at about 300° F.

On one side of the heater block 16 an annular plate 30 of asbestos or the like is separated from the metal block by washers 32 which surround the holding screws 33. This helps to avoid burns by accidental contact between the operator's hand and the hot block.

The body portion 10 of the gun itself has a passage which is defined by a tube 34 having an internal diameter which is substantially larger than a rod 36 of adhesive led through a guide 38 attached to the body of the gun by means of a head 40 on the tube 34, through which pass attaching screws entering the body 10.

To provide for the feeding of the rod 36 through this tube the latter is cut away or slit at its lower side to permit contact with the adhesive by a segment-shaped pawl 42 which has ratchet teeth on its periphery and is normally held in contact with the rod by means of a spring 44 interposed between the segment and a hand lever 48 pivoted at 50 in the handle 12 and provided with a finger piece 52. This pawl 42 is attached to this lever 48 by means of a pivot 54 and the lever is normally held in the position shown in Fig. 2 by means of a spring 56 interposed between the handle and the lever. The upward force exerted by the pawl 42 is absorbed by an anti-friction roll 60 which is rotatably mounted on the top of the body portion and extends through a recess 62 in the tube 34 to bear against the top of the rod 36. It may at times be desirable to substitute a rod of different material or to pull back the rod when use is to be discontinued and, to facilitate this, the pawl 42 is provided with a rectangular end portion 64, the heel of which may be pressed against a ledge 66 in the handle of the gun by exerting an upward force on the finger piece 52 as indicated by the arrow in Fig. 3, thus causing the pawl to be rocked to a position out of contact with the rod so that the latter may be pulled back without resistance by the pawl.

The nozzle 14 is supported on the body of the gun by means of a bracket 68 which is attached to the body portion by means of screws 70 and 72. The outer end of the bracket is split and rounded at 74 to surround the rear end of the nozzle, which then is clamped in position by means of a pinch screw 76. The bracket 68 provides an open space or gap 78 through which the rod passes from the body of the gun before entering the nozzle. This avoids the transference of heat to the tube 34 which if not prevented might be a source of annoyance to the user because of the sticking of the rod in that tube. It further is desirable, in order to keep the rod back of the nozzle from being softened, to keep the rear portion of the nozzle at a temperature no higher than about 180° F. and to that end a series of cooling flanges 80 are provided on the nozzle between the portion which enters the socket of the heater and the portion which is clamped by the split portion 74 of the bracket 68.

Inside the nozzle there is a passage 82 of uniform diameter and an outlet opening 84 of reduced size is provided in a removable tip portion 86. The size of the passage 82 is only a few thousandths of an inch larger than the rod itself and consequently the rod, as it is moved forward by the pawl 42, acts as a piston to force the melted portion 88 out through the outlet opening when the gun has been removed and it is desired to apply adhesive to a piece of work. As heat is absorbed by the gun, the end 90 of the rod will become tapered as the different temperatures of the outlet end and the receiving end of the nozzle act upon the material of the rod 36. This does not, however, affect the plunger action of the rod in pushing out the liquid cement 88.

It will be noted that the socket 92 in the block, into which the nozzle is pressed between periods of use so that heat may be absorbed by the nozzle, is tapered and that the nozzle itself has a similar taper so as to get close contact between the two without having the expansion of the metal nozzle act to keep the tool from being readily removed. To that end, also, the position of the nozzle in the socket is adjustably determined by the end of the upper half 94 of a sleeve 96. This sleeve is coaxial with the nozzle and after being adjustably positioned is held there by means of a set screw 98. There is some tendency for the melted portion of the cement to expand and, accordingly, a drip passage 100 is provided in the block and the lower half 102 of the sleeve 96 is cut back so that it will not interfere with this passage.

In the use of the gun, the operator will turn on the heating units by means of the switch 24 and position the nozzle in the socket of the block 16 so that the tip 86 of the nozzle contacts with the end 94 of the sleeve 96. After an initial wait while the block is heated up and the cement becomes melted in the tip of the nozzle, he will remove the gun and apply the cement to a piece of work, depressing the finger piece 52 intermittently as is necessary in order to extrude the cement through the outlet opening 84. Usually the amount of cement which is to be applied is small enough so that the residual heat in the nozzle 14 will continue to melt the forward end of the rod 36 but, if not, it will be necessary to put the nozzle back in the socket of the block 16 to reheat it and this will be done habitually by the operator whenever he finishes the application of cement to a particular piece of work. If the rod 36 is to be taken out, as at the end of the day, then this may readily be done, after pressing up on the finger piece 52 as indicated in Fig. 3 thereby to draw the pawl 42 away from the rod.

Having thus described my invention, what I claim as new and desire to secure by Letters Patent of the United States is:

1. A body member having a longitudinal passage for a rod of material, said passage being open at one side to expose the rod, a manually operable finger lever pivoted in the body member, a pawl pivotally attached to said finger lever to engage said exposed rod, a spring for pushing the pawl against the rod, and means for tilting the pawl against the action of said spring to remove it from the rod upon reverse movement of the finger lever.

2. A portable tool for applying melted material, said tool having a body member supporting an applying head, the body member having a ledge and a passage for a rod of material to be applied, means for feeding the rod intermittently to the applying head comprising a manually operable finger lever and a rod-engaging pawl pivotally attached thereto, and resilient means for holding the pawl against the rod in the body member, said lever being depressible to cause a forward feeding movement of the rod, said pawl having a heel portion adapted to cooperate with said ledge to throw the pawl against the resilient means out of engagement with the rod upon upward movement of the finger lever.

References Cited in the file of this patent

UNITED STATES PATENTS

| | | |
|---|---|---|
| 619,681 | Dorsey | Feb. 4, 1899 |
| 1,056,497 | Bryan | Mar. 18, 1913 |
| 1,449,517 | Lame | Mar. 27, 1923 |
| 1,993,709 | Chamberlain | Mar. 5, 1935 |
| 2,254,521 | Gardner | Sept. 2, 1941 |
| 2,432,428 | Lang | Dec. 9, 1947 |
| 2,438,525 | Walters | Mar. 30, 1948 |
| 2,454,875 | Hyde | Nov. 30, 1948 |
| 2,604,064 | Sefton | July 22, 1952 |

FOREIGN PATENTS

| | | |
|---|---|---|
| 670,133 | Great Britain | Apr. 16, 1952 |